(12) United States Patent
Gu et al.

(10) Patent No.: US 11,363,344 B2
(45) Date of Patent: Jun. 14, 2022

(54) METHOD AND SYSTEM OF DISPLAYING SUBTITLES, COMPUTING DEVICE, AND READABLE STORAGE MEDIUM

(71) Applicant: Shanghai Hode Information Technology Co., Ltd., Shanghai (CN)

(72) Inventors: Hao Gu, Shanghai (CN); Huaxin Guan, Shanghai (CN); Zhichen Dai, Shanghai (CN); Ming Guo, Shanghai (CN); Puyu Zha, Shanghai (CN)

(73) Assignee: SHANGHAI HODE INFORMATION TECHNOLOGY CO., LTD., Shanghai (CN)

( * ) Notice: Subject to any disclaimer, the term of this patent is extended or adjusted under 35 U.S.C. 154(b) by 0 days.

(21) Appl. No.: 17/098,623

(22) Filed: Nov. 16, 2020

(65) Prior Publication Data

US 2021/0160582 A1   May 27, 2021

(30) Foreign Application Priority Data

Nov. 21, 2019   (CN) .......................... 201911150781.1

(51) Int. Cl.
*H04N 7/00* (2011.01)
*H04N 21/488* (2011.01)
*H04N 21/4402* (2011.01)
*H04N 21/485* (2011.01)

(52) U.S. Cl.
CPC . *H04N 21/4884* (2013.01); *H04N 21/440236* (2013.01); *H04N 21/4856* (2013.01)

(58) Field of Classification Search
CPC ....... H04N 21/4884; H04N 21/440236; H04N 21/4856
See application file for complete search history.

(56) References Cited

U.S. PATENT DOCUMENTS

| | | | |
|---|---|---|---|
| 2002/0122136 A1* | 9/2002 | Safadi | H04N 5/44513 348/465 |
| 2013/0254818 A1* | 9/2013 | Gray | H04N 21/812 725/110 |
| 2016/0105707 A1* | 4/2016 | Chen | H04N 21/4884 725/25 |
| 2018/0367839 A1* | 12/2018 | Vandoros | H04N 21/8547 |
| 2019/0158927 A1* | 5/2019 | Catalano | H04N 21/4884 |
| 2020/0042601 A1* | 2/2020 | Doggett | G06F 40/58 |
| 2020/0260129 A1* | 8/2020 | Strein | H04N 21/2353 |
| 2021/0136459 A1* | 5/2021 | Mathur | G06K 9/6256 |

* cited by examiner

*Primary Examiner* — Kyu Chae
(74) *Attorney, Agent, or Firm* — BakerHostetler

(57) ABSTRACT

The present invention discloses techniques for generating and presenting subtitles. The disclosed techniques comprise extracting target audio information from a video; converting the target audio information to first text information, wherein the target audio information and the first text information are in a first language; translating the first text information to at least one second text information, wherein the at least one second text information is in at least one second language; generating a first subtitle based on the first text information; generating at least one second subtitle based on the at least one second text information; obtaining a first target subtitle and at least one second target subtitle by implementing a sensitive word processing to the first subtitle and the at least one second subtitle, respectively; and presenting at least one of the first target subtitle or the at least one second target subtitle in response to user input.

20 Claims, 3 Drawing Sheets

METHOD AND SYSTEM OF DISPLAYING SUBTITLES, COMPUTING DEVICE, AND READABLE STORAGE MEDIUM

CROSS-REFERENCE TO RELATED APPLICATION

The present invention claims priority of Chinese patent application No. 201911150781.1, filed on Nov. 21, 2019. The entire disclosure of the above-identified application is hereby incorporated by reference herein and made a part of this specification.

BACKGROUND

With the development of the video display technology, subtitle display is required. The existing practice adopts a form of plug-in subtitles, the user translates subtitles and compiles the translated subtitles, then the compiled subtitles are uploaded and reviewed by the backstage. After the compiled subtitles are reviewed, the compiled subtitles are stored in the plug-in subtitle column of a corresponding video.

SUMMARY

The present invention provides a method and a system of displaying subtitle, a computing device and a readable storage medium to solve the defects of manual subtitle translation in the existing technology, which greatly reduces the efficiency and speed of displaying the plug-in subtitles and affects the user experience.

According an aspect of the present invention, a method of displaying subtitle is provided, the method comprising the following steps:

obtaining target audio information from video information;

converting the target audio information to first text information and translating the first text information to at least one kind of second text information, wherein the first text information and the at least one kind of second text information are represented in different language representation forms;

generating a corresponding first subtitle according to the first text information and generating at least one kind of second subtitle according to the at least one kind of second text information;

implementing a sensitive word processing to the first subtitle and the at least one kind of second subtitle to obtain a first target subtitle corresponding to the first subtitle and at least one kind of second target subtitle corresponding to the at least one kind of second subtitle, and storing; and in response to a subtitle display operation instruction sent by a user, displaying a target subtitle corresponding to the subtitle display operation instruction, wherein the target subtitle is one or more of the first target subtitle and the at least one kind of second target subtitle.

Optionally, the implementing a sensitive word processing to the first subtitle and the at least one kind of second subtitle to obtain a first target subtitle and at least one kind of second target subtitle and storing comprises:

matching a plurality of preset words of a preset sensitive word table with a plurality of words of the first subtitle and the at least one kind of second subtitle to obtain target sensitive words from the first subtitle and the at least one kind of second subtitle;

processing the target sensitive words to obtain the first target subtitle and the at least one kind of second target subtitle; and storing the first target subtitle and the at least one kind of second target subtitle in subtitle lists with corresponding language representation forms.

Optionally, the method of processing the target sensitive words at least comprises: replacing the target sensitive words with preset symbols or deleting the target sensitive words.

Optionally, the obtaining target audio information from video information, comprises:

decoding the video information to obtain a decoding result; and extracting the target audio information from the decoding result.

Optionally, the decoding result at least comprises audio information, the audio information comprises noise and the target audio information, the extracting the target audio information from the decoding result comprises implementing noise reduction to the audio information to obtain the target audio information.

Optionally, the converting the target audio information to the first text information and translating the first text information to the at least one kind of second text information, comprises:

identifying a language representation form in the target audio information as the first language representation form;

converting the target audio information to the first text information with the first language representation form; and translating the first text information to the second text information with the other language representation forms.

Optionally, the in response to a subtitle display operation instruction sent by a user, displaying a target subtitle corresponding to the subtitle display operation instruction, comprises:

identifying a target language representation form in the subtitle display operation instruction; and displaying the target subtitle in a subtitle list with the target language representation form according to the target language representation form.

In order to realize the above purposes, the present invention further provides a system of displaying subtitle, the system specifically including the following components:

an obtaining module, obtaining target audio information from video information;

a converting module, converting the target audio information to first text information and translating the first text information to at least one kind of second text information, wherein the first text information and the at least one kind of second text information are represented in different language representation forms;

a generating module, generating a corresponding first subtitle according to the first text information and generating at least one kind of second subtitle according to the at least one kind of second text information;

a processing module, implementing a sensitive word processing to the first subtitle and the at least one kind of second subtitle to obtain a first target subtitle corresponding to the first subtitle and at least one kind of second target subtitle, and storing; and a display module, in response to a subtitle display operation instruction sent by a user, display a target subtitle corresponding to the subtitle display operation instruction, wherein the target subtitle is one or more of the first target subtitle and the at least one kind of second target subtitle.

In order to realize the above purposes, the present invention further provides a computing device, comprising a memory, a processor and computer programs stored in the memory and executed by the processor, wherein the processor executes the computer programs for implementing the steps of the method of displaying subtitle.

In order to realize the above purposes, the present invention further provides a computer-readable storage medium, storing computer programs executed by at least one processor, to cause the processor to implement the steps of the method of displaying subtitle.

The method and system of displaying subtitle, computing device and readable storage medium provided in the present invention, through extracting target audio information from video information, identifying and converting the target audio information to text information and translating the text information to text information with a plurality of languages, and implementing sensitive word filtering to and storing the text information and the translated text information, when a language for the subtitles is clicked by a user, displaying the text information corresponding to the language to increase the efficiency and speed of displaying the plug-in subtitles, and reduce the risks resulted by sensitive words in the subtitles and improves user experience.

BRIEF DESCRIPTION OF THE DRAWINGS

Various other advantages and benefits will become clear to those of ordinary skill in the art by reading the detailed description of the preferred embodiments below. The drawings are only for the purpose of showing preferred embodiments and are not considered to be a limitation of the present invention. In addition, the same reference symbols are used to represent the same components throughout the drawings. In the drawings.

DETAILED DESCRIPTION OF ILLUSTRATIVE EMBODIMENTS

To make the objectives, technical solutions and advantages of the present invention more comprehensible, the present invention is described in further detail below with reference to embodiments and the accompanying drawings. It should be understood that the specific embodiments described herein are merely used for explaining the present invention, and are not intended to limit the present invention. All other embodiments obtained by those skilled in the art based on the embodiments of the present invention without creative efforts shall fall within the protection scope of the present invention.

Figure 1:
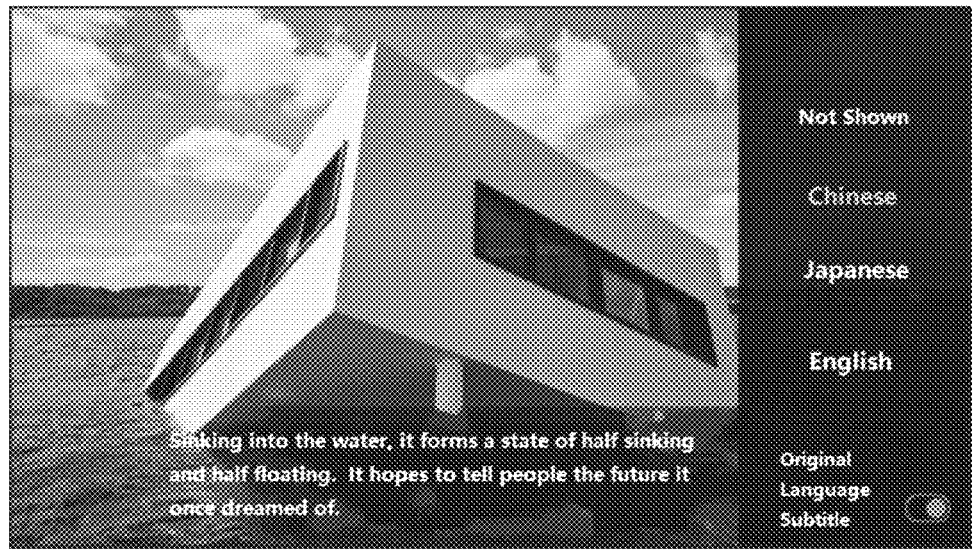
FIG. 1 is a schematic diagram of an optional application environment of a method of displaying subtitle provided by an embodiment of the present disclosure.

FIG. 1 is a schematic diagram of an optional application environment of a method of displaying subtitle. In a video display interface, when a user turns on an original language subtitle button and selects at least one second language, such as Chinese, Japanese or English, the original language subtitle (i.e., the first language subtitle) and at least one second language subtitle corresponding to the original language subtitle will be displayed. The original language subtitle and the second language subtitle are displayed in their respective predetermined forms. For example, a Chinese subtitle may be displayed and located above the original language subtitle (e.g., Japanese subtitle), and the original language subtitle may be displayed at the bottom of the video display interface. In another embodiment, only original language subtitle is displayed when a user turns on the original language subtitle button and selects "Not Shown" for any second language subtitle. In a further embodiment, one or more second language subtitles are displayed but no original language subtitle is displayed when the user selects one or more second language subtitles and turns off the original language subtitle button.

First Embodiment

The method of displaying subtitle provided by the present invention is described in combination with the accompanying drawings.

Figure 2:
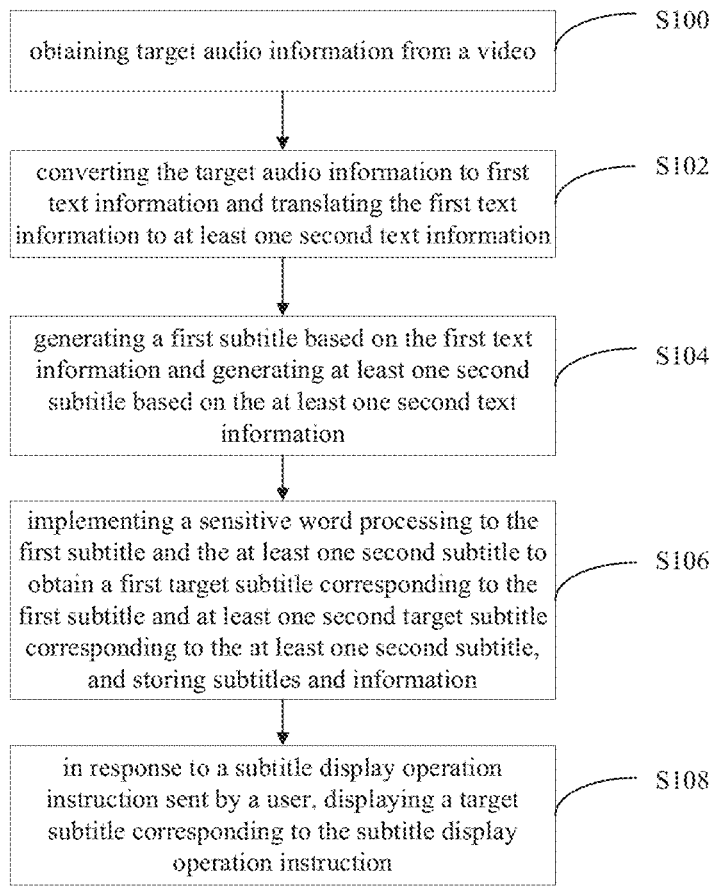
FIG. 2 is an optional flowchart of the method of displaying subtitle provided by a first embodiment.

FIG. 2 is an optional flowchart of a method of displaying subtitle of the present invention, it can be understood that the flowchart in the embodiment of the method is not used to limit the order of execution of the steps, and the following is an exemplary description with computing device as the execution subject. The computing device may be devices with data transmission function, such as a mobile phone, a tablet personal computer, a laptop computer, a server and so on.

As shown in FIG. 2, the method specifically includes the following steps S100~S108.

Step S100, obtaining target audio information from video information.

Exemplarily, when the video information uploaded by the user is received, the video information is obtained, target audio information with low noise is extracted from the video information.

In the present embodiment, the target audio information is obtained from the video information and, of course, in other embodiment, the target audio information is also obtained from the video information using, but is not limited to, other audio extracting technologies.

Step S102, converting the target audio information to first text information and translating the first text information to at least one kind of second text information, wherein, the first text information and the at least one kind of second text information are represented in different language representation forms.

Exemplarily, the target audio information extracted from the video information is converted to the first text information through audio identification technology and the first text information is translated to a plurality of languages. For example, the text information in Korean is translated to various forms of expression, such as, English and Japanese.

Step S104, generating a corresponding first subtitle and at least one kind of second subtitle are generated according to the first text information and the at least one kind of second text information.

Exemplarily, the first text information and the at least one kind of second text information are processed, and a corresponding first subtitle and at least one kind of second subtitle are generated according to a processing result. For example, the text information in Korean is translated to text information in English and Japanese, then, fonts, colors, sizes, display positions and display time of the video being played of the text information in Korean and the translated text information in English and Japanese are processed to confirm the fonts, colors, sizes, display positions and display time of the three language text information respectively, so as to distinguish the text information in different languages according to different display effects of the fonts, the colors, the sizes, the display positions and the display time when the video file is played, and bring better viewing experience for the user. At last, corresponding subtitles are generated based on different display effects, so that the video is not blocked too much while user requirements of watching the subtitles is satisfied and the subtitles are distinguished.

Of course, in order to better show the display effects of the subtitles, the method of displaying subtitle can also automatically adjust line spacing of the subtitles according to the number of the kinds of the subtitles displayed during the video playback, so as to improve the display effect of the subtitles, at the same time, bring better viewing experience for users. For example, when only one language subtitle is displayed, the line spacing is d1; when two language subtitles are displayed, the line spacing is d2; and, when three language subtitles are displayed, the line spacing is d3, where d1>d2>d3.

In an exemplary embodiment, after the subtitles are generated, the subtitles are added with a corresponding timestamp, when the video is being played, the timestamp of the video playback is monitored, when the timestamp of the video playback is consistent with the timestamp of the subtitles, the subtitles are displayed to keep the subtitles synchronized with the video.

It should be noted that display duration of each subtitle is determined according to an audio length during the video playback. When the user clicks to display subtitles in other languages during the video playback, the timestamp during the video playback is monitored, and the timestamp is compared with a timestamp and the display duration of the subtitles in a subtitle list, and the subtitles to be displayed and the display duration of the subtitles are determined according to a comparison result. For example, the current video playback only displays the subtitles in Chinese, the subtitle list stores the subtitle 1 in English and the timestamp of the subtitle 1 is t1, and the display duration of the subtitle 1 in English is t2, when the video playback proceeds to t3, where t1<t3<(t1+t2), the user clicks to display the subtitles in English, the subtitle 1 in English is then displayed, and the display duration is t=t1+t2−t3. By controlling the display duration of the subtitles, the accurate synchronization of the subtitles and the video can be further ensured.

Step S106, implementing a sensitive word processing to the first subtitle and the at least one kind of second subtitle to obtain a first target subtitle corresponding to the first subtitle and at least one kind of second target subtitle corresponding to the least one kind of second subtitle, and storing. The first target subtitle is a subtitle obtained by implementing the sensitive word processing to the first subtitle. The second target subtitle is a subtitle obtained by implementing the sensitive word processing to the second subtitle.

Step S108, in response to a subtitle display operation instruction sent by a user, displaying a target subtitle corresponding to the subtitle display operation instruction, wherein the target subtitle is one or more of the first target subtitle and the at least one kind of second target subtitle.

Exemplarily, please refer to FIG. 1, when the user only activates the subtitle with the original language, an instruction of activating the subtitle with the original language is received from the user, and the subtitle with the original language is displayed according to the instruction. When the original language subtitle is not the Chinese subtitle and the user activates the subtitle with the original language and lights up the subtitle in Chinese, an instruction of activating the subtitle with the original language and lighting up the Chinese subtitle is received, and the subtitle with the original language and the Chinese subtitle are displayed according to the instruction.

Figure 3:
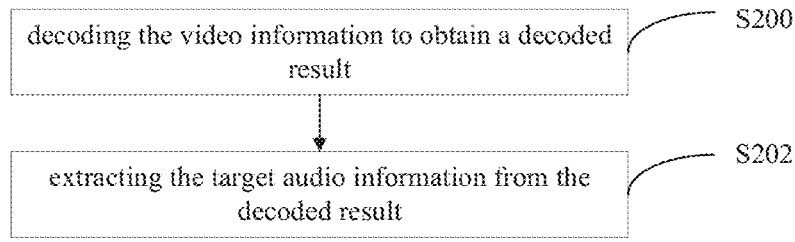
FIG. 3 is an optional specific flowchart of step S100 in the FIG. 2.

In an exemplary embodiment, as shown in FIG. 3, the step S100 may include steps S200~S202.

Step S200, decoding the video information to obtain a decoding result.

Exemplarily, as the video information obtained has been encoded, the video information has to be decoded to obtain the decoding result.

Step S202, extracting the target audio information from the decoding result.

Exemplarily, when the noise in the video information obtained exceeds a preset threshold, after the decoding result is obtained, the audio information having noise is obtained from the decoding result, and a noise reduction is implemented to the audio information to obtain the target audio information.

Figure 4:
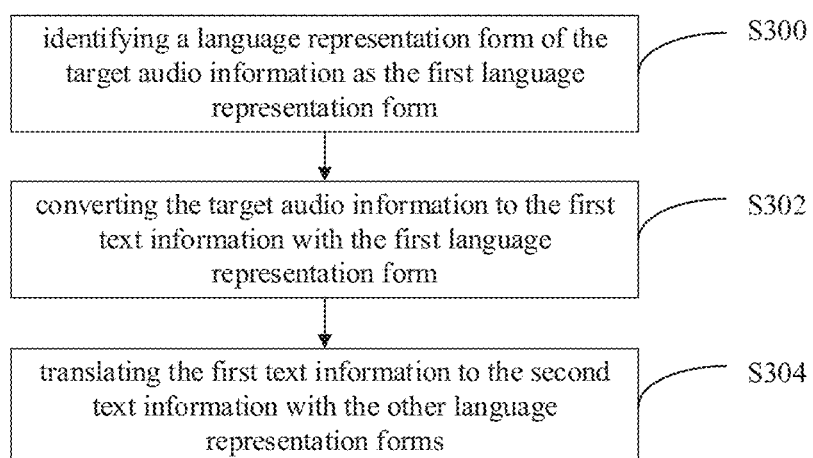
FIG. 4 is an optional specific flowchart of step S102 in the FIG. 2.

In an exemplary embodiment, as shown in FIG. 4, the step S102 may include steps S300~S304.

Step S300, identifying a language representation form of the target audio information as the first language representation form.

Exemplarily, if the audio information obtained from the video information is identified as Korean, the language representation form of the target audio information is identified as a Korean representation form. It should be noted that the language representation form of the target audio information extracted from the video information is the language representation form corresponding to the subtitle with the original language shown in FIG. 1.

Step S302, converting the target audio information to the first text information with the first language representation form.

Exemplarily, please refer to FIG. 1, the audio information of Korean is converted to the text information with the Korean representation form.

Step S304, translating the first text information to the second text information with the other language representation forms.

Exemplarily, the text information with the Korean representation form is translated to the text information with the Chinese representation form. The text information in the audio information can be rapidly translated to the text information in other languages through embodiment of the present invention.

Figure 5:
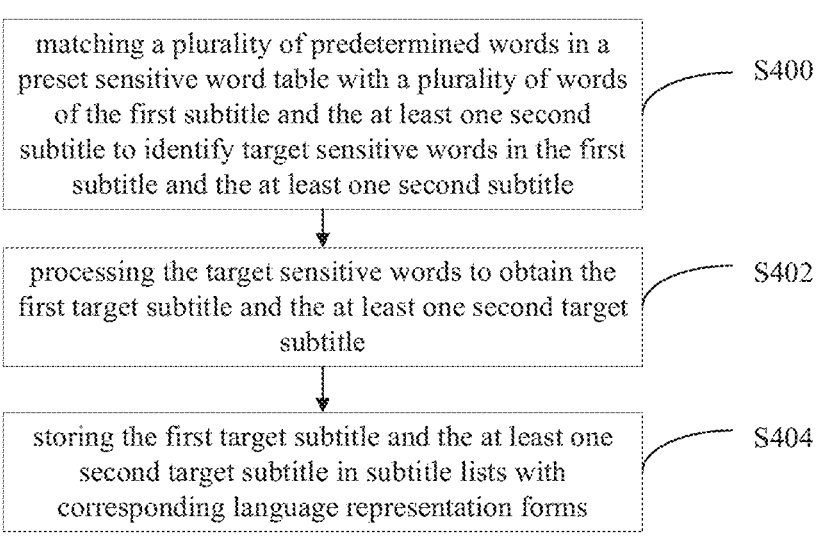
FIG. 5 is an optional specific flowchart of step S106 in the FIG. 2.

In an exemplary embodiment, as shown in FIG. 5, the step S106 may include steps S400~S404.

Step S400, matching a plurality of preset words of a preset sensitive word table with a plurality of words of the first subtitle and the at least one kind of second subtitle to obtain target sensitive words from the first subtitle and the at least one kind of second subtitle.

Exemplarily, the plurality of the preset words of the preset sensitive word table in a database are matched with the words of Korean subtitle and the Chinese subtitle, if the match is successful, it is determined that the words of the Korean subtitle and the Chinese subtitle are sensitive words, and the sensitive words are obtained. Of course, during the process of matching the plurality of the preset words of the preset sensitive word table in the database with the Korean subtitle and the Chinese subtitle, a semantic recognition may be implemented to the Korean subtitle and the Chinese subtitle, and nouns, verbs, adjectives the like are extracted from the subtitles to achieve word segmentation according to a semantic recognition result, and the plurality of words are obtained according to the word segmentation result. It should be noted that, in order to ensure accuracy of the word segmentation result, the plurality of the words obtained by the word segmentation result may be matched with the words stored in a preset semantic words database to determine whether the word segmentation result should be adjusted according to the matching result. The Korean subtitle indicates the subtitle corresponding to the text information with the Korean representation form. The Chinese subtitle indicates the subtitle corresponding to the text information with the Chinese representation form.

Step S402, processing the target sensitive words to obtain the first target subtitle and the at least one kind of second target subtitle.

Exemplarily, when the target sensitive words are obtained, the target sensitive words are processed, for example, a blur processing is implemented to the target sensitive words, or the target sensitive words are replaced by preset symbols, or the target sensitive words are deleted. The target sensitive words of the first subtitle and the at least one second subtitle are processed to obtain the first target subtitle and the at least one kind of second target subtitle.

Step S404, storing the first target subtitle and the at least one kind of second target subtitle in subtitle lists with corresponding language representation forms.

Exemplarily, the Korean subtitle is stored in a subtitle list with the Korean representation form, while the Chinese subtitle is stored in a subtitle list with the Chinese representation form. The sensitive words in the subtitle can be rapidly identified using the embodiment of the present invention, and the sensitive words are processed, which improves user's viewing experience.

Figure 6:
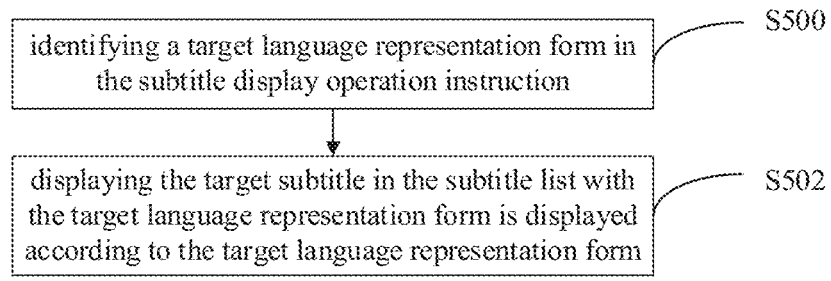
FIG. 6 is an optional specific flowchart of step S108 in the FIG. 2.

In an exemplary embodiment, as shown in FIG. 6, the step S108 may include steps S500~S502.

Step S500, identifying a target language representation form in the subtitle display operation instruction.

Step S502, displaying the target subtitle in the subtitle list with the target language representation form is displayed according to the target language representation form.

Exemplarily, please refer to FIG. 1, when the user activates the subtitle with the original language and lights up the Chinese subtitle, the instruction of the subtitle with the original language and the Chinese subtitle is received, and the subtitle display operation instruction is identified as the Korean and Chinese representation forms, and the Korean subtitle in the subtitle list with the Korean representation form and the Chinese subtitle in the subtitle list with the Chinese representation form are displayed.

Second Embodiment

Figure 7:
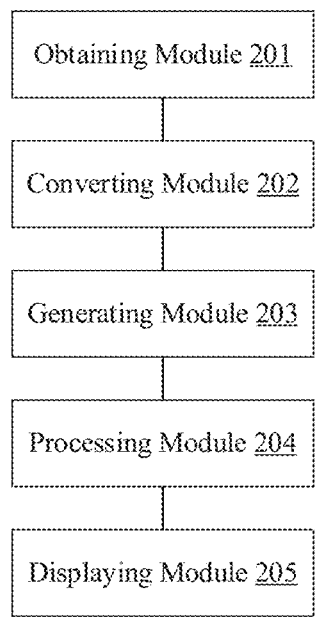
FIG. 7 is a schematic diagram of functional blocks of a system of displaying subtitle provided by a second embodiment.

Basing on the method of displaying subtitle provided in the first embodiment, this embodiment provides a system of displaying subtitle, which can be applied to computer equipment. Specifically, FIG. 7 is an optional schematic diagram of functional blocks of the system of displaying subtitle, the system of displaying subtitle is divided into one or more program modules, the one or more program modules are stored in a storage medium and are performed by one or more processors to complete the present invention. The program modules in the present invention refer to a series of computer program instruction segments that can complete specific functions, which is more suitable than the program itself to describe the execution process of the system of displaying subtitle in the storage medium, the following description will specifically introduce functions of the program modules of this embodiment.

As shown in FIG. 7, the system of displaying subtitle is composed of the following components.

An obtaining module 201, obtaining target audio information from video information.

Exemplarily, when the video information uploaded by the user is received, the obtaining module 201 obtains the video information, and extracts target audio information with low noise from the video information.

In the present embodiment, the target audio information is obtained from the video information and, of course, in other embodiment, the target audio information is also obtained from the video information using, but is not limited to, other audio extracting technologies.

A converting module 202, converting the target audio information to first text information and translating the first text information to at least one kind of second text information, wherein, he first text information and the at least one kind of second text information are represented in different language representation forms.

Exemplarily, the converting module 202 converts the target audio information extracted from the video information to the first text information through audio identification technology and translates the first text information to a plurality of languages. For example, the text information in Korean is translated to various forms of expression, such as, English and Japanese.

A generating module 203, generating a corresponding first subtitle and at least one kind of second subtitle according to the first text information and the at least one kind of second text information.

Exemplarily, the generating module 203 processes the first text information and the at least one kind of second text information and generates a corresponding first subtitle and at least one kind of second subtitle according to a processing result. For example, the text information in Korean is translated to text information in English and Japanese, then, fonts, colors, sizes, display positions and display time of the video being played of the text information in Korean and the translated text information in English and Japanese are processed to confirm the fonts, colors, sizes, display positions and display time of the three language text information respectively, so as to distinguish the text information in different languages according to different display effects of the fonts, the colors, the sizes, the display positions and the display time when the video file is played, and bring better viewing experience for the user. At last, corresponding subtitles are generated based on different display effects, so that the video is not blocked too much while user requirements of watching the subtitles is satisfied and the subtitles are distinguished.

Of course, in order to better show the display effects of the subtitles, the method of displaying subtitle can also automatically adjust line spacing of the subtitles according to the number of the kinds of the subtitles displayed during the video playback, so as to improve the display effect of the subtitles, at the same time, bring better viewing experience for users. For example, when only one language subtitle is displayed, the line spacing is d1; when two language subtitles are displayed, the line spacing is d2; and, when three language subtitles are displayed, the line spacing is d3, where d1>d2>d3.

In an exemplary embodiment, after the subtitles are generated, the subtitles are added with a corresponding timestamp, when the video is being played, the timestamp of the video playback is monitored, when the timestamp of the video playback is consistent with the timestamp of the subtitles, the subtitles are displayed to keep the subtitles synchronized with the video.

It should be noted that display duration of each subtitle is determined according to an audio length during the video playback. When the user clicks to display subtitles in other languages during the video playback, the timestamp during the video playback is monitored, and the timestamp is compared with a timestamp and the display duration of the subtitles in a subtitle list, and the subtitles to be displayed and the display duration of the subtitles are determined according to a comparison result. For example, the current video playback only displays the subtitles in Chinese, the subtitle list stores the subtitle 1 in English and the timestamp of the subtitle 1 is t1, and the display duration of the subtitle 1 in English is t2, when the video playback proceeds to t3, where t1<t3<(t1+t2), the user clicks to display the subtitles in English, the subtitle 1 in English is then displayed, and the display duration is t=t1+t2−t3. By controlling the display duration of the subtitles, the accurate synchronization of the subtitles and the video can be further ensured.

A processing module 204, implementing a sensitive word processing to the first subtitle and the at least one kind of second subtitle to obtain a first target subtitle corresponding to the first subtitle and at least one kind of second target subtitle corresponding to the at least one kind of second subtitle, and storing. The first target subtitle is a subtitle obtained by implementing the sensitive word processing to the first subtitle. The second target subtitle is a subtitle obtained by implementing the sensitive word processing to the second subtitle.

A displaying module 205, in response to a subtitle display operation instruction sent by a user, displaying a target subtitle corresponding to the subtitle display operation instruction, wherein the target subtitle is one or more of the first target subtitle and the at least one kind of second target subtitle.

Exemplarily, please refer to FIG. 1, when the user only activates the subtitle with the original language, an instruction of activating the subtitle with the original language is received from the user, then, the displaying module 205 displays the subtitle with the original language according to the instruction. When the original language subtitle is not the Chinese subtitle and the user activates the subtitle with the original language and lights up the subtitle in Chinese, an instruction of activating the subtitle with the original language and lighting up the Chinese subtitle is received, and the subtitle with the original language and the Chinese subtitle are displayed according to the instruction.

In an exemplary embodiment, the obtaining module 201 decodes the video information to obtain a decoding result and extracts the target audio information from the decoding result.

Exemplarily, as the video information obtained has been encoded, the video information encoded has to be decoded to obtain the decoding result. When the noise in the video information obtained exceeds a preset threshold, after the decoding result is obtained, the audio information having noise is obtained from the decoding result, and a noise reduction is implemented to the audio information to obtain the target audio information.

In an exemplary embodiment, the converting module 102 further includes a first identifying unit, a converting unit and a translating unit.

The first identifying unit identifies a language representation form of the target audio information as the first language representation form.

Exemplarily, if the audio information obtained from the video information is identified as Korean, the language representation form of the target audio information is identified as a Korean representation form. It should be noted that the language representation form of the target audio information extracted from the video information is the language representation form corresponding to the subtitle with the original language shown in FIG. 1.

The converting unit converts the target audio information to the first text information with the first language representation form.

Exemplarily, please refer to FIG. 1, the audio information of Korean is converted to the text information with the Korean representation form.

The translating unit translates the first text information to the second text information with the other language representation forms.

Exemplarily, the text information with the Korean representation form is translated to the text information with the Chinese representation form. The text information in the audio information can be rapidly translated to the text information in other languages through embodiment of the present invention.

In an exemplary embodiment, the processing module 106 further includes an obtaining unit, a processing unit and a storing unit.

The obtaining unit matches a plurality of preset words of a preset sensitive word table with a plurality of words of the first subtitle and the at least one kind of second subtitle to obtain target sensitive words from the first subtitle and the at least one kind of second subtitle.

Exemplarily, the plurality of the preset words of the preset sensitive word table in a database are matched with the words of Korean subtitle and the Chinese subtitle, if the match is successful, it is determined that the words of the Korean subtitle and the Chinese subtitle are sensitive words, and the sensitive words are obtained. Of course, during the process of matching the plurality of the preset words of the preset sensitive word table in the database with the Korean subtitle and the Chinese subtitle, a semantic recognition may be implemented to the Korean subtitle and the Chinese subtitle, and nouns, verbs, adjectives the like are extracted from the subtitles to achieve word segmentation according to a semantic recognition result, and the plurality of words are obtained according to the word segmentation result. It should be noted that, in order to ensure accuracy of the word segmentation result, the plurality of the words obtained by the word segmentation result may be matched with the words stored in a preset semantic words database to determine whether the word segmentation result should be adjusted according to the matching result. The Korean subtitle indicates the subtitle corresponding to the text information with the Korean representation form. The Chinese subtitle indicates the subtitle corresponding to the text information with the Chinese representation form.

The processing unit processes the target sensitive words to obtain the first target subtitle and the at least one kind of second target subtitle.

Exemplarily, when the target sensitive words are obtained, the target sensitive words are processed, for example, a blur processing is implemented to the target sensitive words, or the target sensitive words are replaced by preset symbols, or the target sensitive words are deleted. The target sensitive words of the first subtitle and the at least one second subtitle are processed to obtain the first target subtitle and the at least one kind of second target subtitle.

The storing unit stores the first target subtitle and the at least one kind of second target subtitle in subtitle lists with corresponding language representation forms.

Exemplarily, the Korean subtitle is stored in a subtitle list with the Korean representation form, while the Chinese subtitle is stored in a subtitle list with the Chinese representation form. The sensitive words in the subtitle can be rapidly identified using the embodiment of the present invention, and the sensitive words are processed, which improves user's viewing experience.

In an exemplary embodiment, the processing module 106 further includes a second identifying unit and a display unit.

The second identifying unit identifies a target language representation form in the subtitle display operation instruction.

The display unit displays the target subtitle in the target subtitle list with the target language representation form according to the target language representation form.

Exemplarily, please refer to FIG. 1, when the user activates the subtitle with the original language and lights up the Chinese subtitle, the instruction of the subtitle with the original language and the Chinese subtitle is received, and the subtitle display operation instruction is identified as the Korean and Chinese representation forms, and the Korean subtitle in the subtitle list with the Korean representation form and the Chinese subtitle in the subtitle list with the Chinese representation form are displayed.

Third Embodiment

Figure 8:
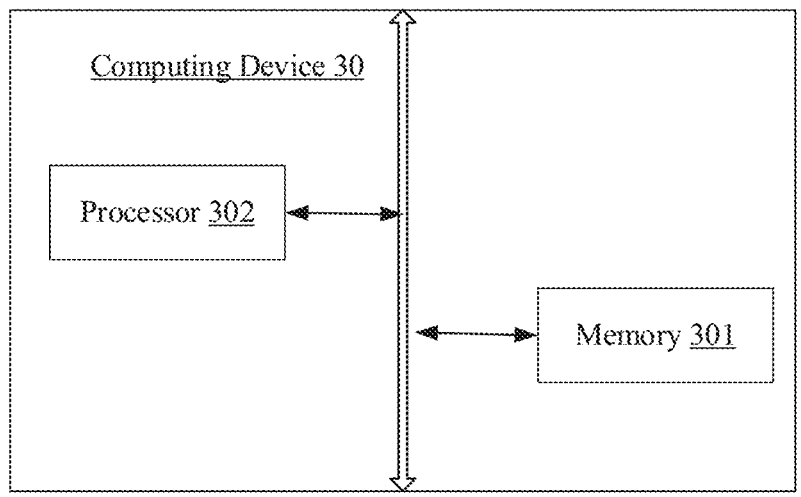
FIG. 8 is a schematic diagram of the hardware architecture of a computing device provided by a third embodiment.

This embodiment also provides a computing device, such as a smartphone, a tablet computer, a laptop computer, a desktop computer, a rack server, a blade server, a tower server, or a rack server (including an independent server, or a server cluster composed of multiple servers), etc. As shown in FIG. 8, the computing device 30 of this embodiment includes at least but not limited to: a memory 301, communicatively connected to each other through a system bus, and a processor 302. It should be noted that FIG. 8 only shows the computing device 30 having the components 301-302, but it should be understood that it is not required to implement all the displayed components, and more or fewer components may be implemented instead.

In this embodiment, the memory 301 (that is read-only storage medium) includes a flash memory, a hard disk, a multimedia card, a card-type memory (for example, SD or DX memory, etc.), a random access memory (RAM), a static random access memory (SRAM), a read-only memory (ROM), an electrically erasable programmable read-only memory (EEPROM), a programmable read-only memory (PROM), a magnetic memory, a magnetic disk, an optical disk, etc. In some embodiments, the memory 301 may be an internal storage unit of the computing device 30, such as a hard disk or memory of the computing device 30. In other embodiments, the memory 301 may also be an external storage device of the computing device 30, for example, a plug-in hard disk equipped on the computing device 30, a smart memory card (SMC), or a secure digital (SD) card, a flash card, etc. Of course, the memory 301 may also include both the internal storage unit of the computing device 30 and its external storage device. In this embodiment, the memory 301 is generally used to store an operating system and various application software installed on the computing device 30, such as program codes of the system of displaying subtitle of the second embodiment. In addition, the memory 301 can also be used to temporarily store various kinds of data that have been output or are to be output.

The processor 302 may be a Central Processing Unit (CPU), a controller, a microcontroller, a microprocessor, or any other data processing chip in some embodiments. The processor 302 is generally used to control the overall operation of the computing device 30.

Specifically, in this embodiment, the processor 302 is configured to execute the program of the method of displaying subtitle stored in the processor 302, and the following steps are implemented when the program of the method of displaying subtitle is executed:

obtaining target audio information from video information;

converting the target audio information to first text information and translating the first text information to at least one kind of second text information, wherein the first text information and the at least one kind of second text information are represented in different language representation forms;

generating a corresponding first subtitle according to the first text information and generating at least one kind of second subtitle according to the at least one kind of second text information;

implementing a sensitive word processing to the first subtitle and the at least one kind of second subtitle to obtain a first target subtitle corresponding to the first subtitle and at least one kind of second target subtitle corresponding to the at least one kind of second subtitle, and storing; and in response to a subtitle display operation instruction sent by a user, displaying a target subtitle corresponding to the subtitle display operation instruction, wherein the target subtitle is one or more of the first target subtitle and the at least one kind of second target subtitle.

For the specific embodiment process of the above method steps, please refer to the first embodiment, which will not be repeated here.

Fourth Embodiment

This embodiment further provides a computer-readable storage medium, such as a flash memory, a hard disk, a multimedia card, a card-type memory (for example, SD or DX memory, etc.), a random access memory (RAM), a static random access memory (SRAM), a read only memory (ROM), an electrically erasable programmable read-only memory (EEPROM), programmable read-only memory (PROM), a magnetic memory, magnetic disk, an optical disk, a server, an APP store, etc., on which computer programs are stored, when the computer program is executed by the processor, the following method steps are implemented:

obtaining target audio information from video information;

converting the target audio information to first text information and translating the first text information to at least one kind of second text information, wherein the first text information and the at least one kind of second text information are represented in different language representation forms;

generating a corresponding first subtitle according to the first text information and generating at least one kind of second subtitle according to the at least one kind of second text information;

implementing a sensitive word processing to the first subtitle and the at least one kind of second subtitle to obtain a first target subtitle corresponding to the first subtitle and at least one kind of second target subtitle corresponding to the at least one kind of second subtitle, and storing; and in response to a subtitle display operation instruction sent by a user, displaying a target subtitle corresponding to the subtitle display operation instruction, wherein the target subtitle is one or more of the first target subtitle and the at least one kind of second target subtitle.

For the specific embodiment process of the above method steps, please refer to the first embodiment, which will not be repeated here.

The method and system of displaying subtitle, computing device and computer-readable storage medium provided in the present invention, extracts target audio information from video information, identifies and converts the target audio information to text information and translates the text information to text information with a plurality of languages, and implements a sensitive word filtering to and storing the text information and the translated text information, when a language for the subtitles is clicked by a user, displays the text information for the subtitles corresponding to the language. Through the embodiments of the present invention, the efficiency and speed of displaying the plug-in subtitles are increased, risks resulted by sensitive words in the subtitles are reduced and user experience is improved.

It should be noted that in this article, the terms "include", "comprise" or any other variant thereof are intended to cover non-exclusive inclusion, so that a process, method, article or device that includes a series of elements includes not only those elements, but also the other elements that are not explicitly listed, or include elements inherent to this process, method, article, or device. Without more restrictions, the element defined by the sentence "include one . . . " does not exclude that there are other identical elements in the process, method, article or device that includes the element.

The sequence numbers of the above embodiments of the present invention are used for description only, and do not represent the advantages and disadvantages of the embodiments.

In view of the description of the above embodiments, those skilled in the art can clearly understand that the methods in the above embodiments can be implemented by means of software plus a necessary general hardware platform, and of course, can also be implemented by hardware, but in many cases the former is better implementation.

The above are only the preferred embodiments of the present invention, and do not limit the scope of the present invention. Any equivalent structure or equivalent process transformation made by using the content of the description and drawings of the present invention, or directly or indirectly applied to other related technical fields. The same reason is included in the scope of patent protection of the present invention.

What is claimed is:

1. A method of generating and presenting subtitles, comprising:

extracting target audio information from a video;

converting the target audio information to first text information using an audio identification algorithm, wherein the target audio information and the first text information are in a first language;

converting the first text information to at least one second text information, wherein the at least one second text information is in at least one second language that is different from the first language;

generating a first subtitle based on the first text information, wherein the first subtitle is in the first language;

generating at least one second subtitle based on the at least one second text information, wherein the at least one second subtitle is in the at least one second language;

implementing a sensitive word processing to the first subtitle and the at least one second subtitle to obtain a first target subtitle corresponding to the first subtitle and at least one second target subtitle corresponding to the at least one second subtitle, wherein the first target subtitle is in the first language, and the at least one second target subtitle is in the at least one second language;

storing the first target subtitle, the at least one second target subtitle, and information indicative of corresponding relationship between them;

presenting the first target subtitle in response to receiving first user input on a first interface element; and presenting the at least one second target subtitle in response to receiving second user input on a second interface element.

2. The method of claim 1, wherein the generated first subtitle and the generated at least one second subtitle further comprise information indicative of their respective attributes so that their corresponding target subtitles are to be presented with different display effects.

3. The method of claim 2, wherein the attributes comprise at least one of font, color, size, display position, or display time.

4. The method of claim 1, further comprising:

determining a display duration of the first target subtitle or the at least one second target subtitle based at least in part on an audio length corresponding to the target audio information during playing the video.

5. The method of claim 1, wherein the implementing a sensitive word processing to the first subtitle and the at least one second subtitle further comprises:

comparing a plurality of predetermined sensitive words with the first subtitle and the at least one second subtitle to identity target sensitive words included in the first subtitle and the at least one second subtitle;

processing the target sensitive words to obtain the first target subtitle and the at least one second target subtitle; and storing the first target subtitle and the at least one second target subtitle in subtitle lists of corresponding languages.

6. The method of claim 5, wherein the processing the target sensitive words further comprises replacing the target sensitive words with predetermined symbols or deleting the target sensitive words.

7. The method of claim 1, wherein the extracting target audio information from a video further comprises:

decoding the video information to obtain a decoded result; and extracting the target audio information from the decoded result.

8. The method of claim 7, further comprising:

implementing noise reduction to the decoded result.

9. A system of generating and presenting subtitles, comprising:
    at least one processor; and
    at least one memory communicatively coupled to the at least one processor and storing instructions that upon execution by the at least one processor cause the system to perform operations, the operations comprising:
    extracting target audio information from a video;
    converting the target audio information to first text information using an audio identification algorithm, wherein the target audio information and the first text information are in a first language;
    converting the first text information to at least one second text information, wherein the at least one second text information is in at least one second language that is different from the first language;
    generating a first subtitle based on the first text information, wherein the first subtitle is in the first language;
    generating at least one second subtitle based on the at least one second text information, wherein the at least one second subtitle is in the at least one second language;
    implementing a sensitive word processing to the first subtitle and the at least one second subtitle to obtain a first target subtitle corresponding to the first subtitle and at least one second target subtitle corresponding to the at least one second subtitle, wherein the first target subtitle is in the first language, and the at least one second target subtitle is in the at least one second language;
    storing the first target subtitle, the at least one second target subtitle, and information indicative of corresponding relationship between them;
    presenting the first target subtitle in response to receiving first user input on a first interface element; and
    presenting the at least one second target subtitle in response to receiving second user input on a second interface element.

10. The system of claim 9, wherein the generated first subtitle and the generated at least one second subtitle further comprise information indicative of their respective attributes so that their corresponding target subtitles are to be presented with different display effects.

11. The system of claim 10, wherein the attributes comprise at least one of font, color, size, display position, or display timing.

12. The system of claim 9, the operations further comprising:
    determining a display duration of the first target subtitle or the at least one second target subtitle based at least in part on an audio length corresponding to the target audio information during playing the video.

13. The system of claim 9, wherein the implementing a sensitive word processing to the first subtitle and the at least one second subtitle further comprises:
    comparing a plurality of predetermined sensitive words with the first subtitle and the at least one second subtitle to identify target sensitive words included in the first subtitle and the at least one second subtitle;
    processing the target sensitive words to obtain the first target subtitle and the at least one second target subtitle; and
    storing the first target subtitle and the at least one second target subtitle in subtitle lists of corresponding languages.

14. The system of claim 13, wherein the processing the target sensitive words further comprises replacing the target sensitive words with predetermined symbols or deleting the target sensitive words.

15. The system of claim 9, wherein the extracting target audio information from a video further comprises:
    decoding the video information to obtain a decoded result; and
    extracting the target audio information from the decoded result.

16. A non-transitory computer-readable storage medium, storing computer-readable instructions that upon execution by a processor cause the processor to implement operations comprising:
    extracting target audio information from a video;
    converting the target audio information to first text information using an audio identification algorithm, wherein the target audio information and the first text information are in a first language;
    converting the first text information to at least one second text information, wherein the at least one second text information is in at least one second language that is different from the first language;
    generating a first subtitle based on the first text information, wherein the first subtitle is in the first language;
    generating at least one second subtitle based on the at least one second text information, wherein the at least one second subtitle is in the at least one second language;
    implementing a sensitive word processing to the first subtitle and the at least one second subtitle to obtain a first target subtitle corresponding to the first subtitle and at least one second target subtitle corresponding to the at least one second subtitle, wherein the first target subtitle is in the first language, and the at least one second target subtitle is in the at least one second language;
    storing the first target subtitle, the at least one second target subtitle, and information indicative of corresponding relationship between them;
    presenting the first target subtitle in response to receiving first user input on a first interface element; and
    presenting the at least one second target subtitle in response to receiving second user input on a second interface element.

17. The non-transitory computer-readable storage medium of claim 16, wherein the generated first subtitle and the generated at least one second subtitle further comprise information indicative of their respective attributes so that their corresponding target subtitles are to be presented with different display effects.

18. The non-transitory computer-readable storage medium of claim 16, the operations further comprising:
    determining a display duration of the first target subtitle or the at least one second target subtitle based at least in part on an audio length corresponding to the target audio information during playing the video.

19. The non-transitory computer-readable storage medium of claim 16, wherein the implementing a sensitive word processing to the first subtitle and the at least one second subtitle further comprises:
    comparing a plurality of predetermined sensitive words with the first subtitle and the at least one second subtitle to identify target sensitive words included in the first subtitle and the at least one second subtitle;
    processing the target sensitive words to obtain the first target subtitle and the at least one second target subtitle; and storing the first target subtitle and the at least one second target subtitle in subtitle lists of corresponding languages.

20. The non-transitory computer-readable storage medium of claim 16, wherein the extracting target audio information from a video further comprises:
decoding the video information to obtain a decoded result; and
extracting the target audio information from the decoded result.

* * * * *